(12) United States Patent
Lee

(10) Patent No.: US 6,726,008 B1
(45) Date of Patent: Apr. 27, 2004

(54) BOX FOR STORING AUDIO-VISUAL OR COMPUTER MEDIA DISK

(75) Inventor: Kong Bun Lee, North Point (HK)

(73) Assignee: Gain Development Industrial Limited, Chaiwan (HK)

( * ) Notice: Subject to any disclaimer, the term of this patent is extended or adjusted under 35 U.S.C. 154(b) by 67 days.

(21) Appl. No.: 10/316,817

(22) Filed: Dec. 11, 2002

(51) Int. Cl.$^7$ ................................................. B65D 85/57
(52) U.S. Cl. ..................................... 206/310; 206/308.1
(58) Field of Search ............................. 206/307, 308.1, 206/309, 310, 493

(56) References Cited

U.S. PATENT DOCUMENTS

| | | |
|---|---|---|
| 5,526,926 A | 6/1996 | Deja |
| 5,685,427 A | 11/1997 | Kuitems et al. |
| 5,788,068 A | 8/1998 | Fraser et al. |
| 5,829,582 A | 11/1998 | Ippolito et al. |
| 5,887,713 A | 3/1999 | Smith et al. |
| 5,944,181 A | 8/1999 | Lau |
| 6,053,311 A * | 4/2000 | Grobecker et al. ......... 206/308.1 |
| D438,418 S | 3/2001 | Myszka et al. |
| 6,196,384 B1 * | 3/2001 | Belden, Jr. ................. 206/308.1 |
| D439,786 S | 4/2001 | Myszka et al. |
| 6,398,022 B1 | 6/2002 | Mou et al. |
| 6,401,920 B2 * | 6/2002 | Gelardi ..................... 206/308.1 |
| 6,419,084 B1 | 7/2002 | Sandor |
| 6,427,833 B1 * | 8/2002 | Hui .............................. 206/310 |
| 6,547,068 B2 * | 4/2003 | Chu ........................... 206/308.1 |
| 6,550,612 B2 * | 4/2003 | Tajima ....................... 206/308.1 |

* cited by examiner

Primary Examiner—Luan K. Bui

(57) ABSTRACT

A diskette storage box for audio-visual or computer media disks includes a front cover and a rear cover having a disk retaining mechanism that includes plural first surfaces that extend upward from the rear cover and inward towards a center position aligned with a center of the disk. The disk retaining mechanism includes a set of riser tabs that extend up from the first surfaces and each riser tab includes a respective retaining tab that retains the disk. The disk retaining mechanism also includes a riser tabs limiting device that is coupled to the riser tabs and that limits movement of riser tabs while being depressed for releasing a retained disk.

5 Claims, 3 Drawing Sheets

BOX FOR STORING AUDIO-VISUAL OR COMPUTER MEDIA DISK

FIELD OF THE INVENTION

The present invention relates to a diskette storage box for one or more audio, audio-visual or computer media disks, including CDs, CD-ROMs, CD-RWs, DVDs and the like.

BACKGROUND OF THE INVENTION

Compact disks that store music (e.g., CD), data (e.g., CD-ROM, CD-R, CD-RW) and video (e.g., DVD) are quite common and are in wide-spread usage. These types of disks commonly are stored in plastic storage boxes known as jewel boxes. Generally, these boxes include some sort of central retaining mechanism that holds a disk by utilizing the disk's center hole. Examples of various types of boxes are shown in U.S. Pat. No. 6,398,022, U.S. Pat. No. 6,419,084, U.S. Pat. No. 5,829,582, U.S. Pat. No. Des. 438,418, U.S. Pat. No. Des. 439,786, U.S. Pat. No. 5,944,181, U.S. Pat. No. 5,788,068, U.S. Pat. No. 5,526,926, U.S. Pat. No. 5,685,427 and U.S. Pat. No. 5,887,713.

Some of the boxes shown in these patents require that an undesirable force be exerted on a disk to facilitate removal. Other boxes disclosed alleviate this problem but do so in a manner that requires excessive pressure be exerted on the central retaining mechanism before the disk is released. Still other box designs, while alleviating this problem, retain a disk in a somewhat flimsy manner. Yet further designs utilize retaining mechanisms that tend to fail, for example, by breaking or losing their retaining capability, after repeated usage, that is, after a disk in inserted into and removed from the box multiple times.

OBJECTS OF THE INVENTION

It is therefore a general object of the invention to provide a disk storage box that overcomes the problems associated with prior art designs.

If is a further object of the present invention to provide a disk storage box that allows for the insertion and removal of disks in a quick, easy and efficient manner.

Various other objects, advantages and features of the present invention will become readily apparent to those of ordinary skill in the art, and the novel features will be particularly pointed out in the appended claims.

SUMMARY OF THE INVENTION

In accordance with the present invention, a box for retaining a disk having a center hole includes a front cover, and a rear cover adapted to retain a disk having a center hole, the front and rear covers being rotatably attached so that the box can be opened and closed by movement of the front cover away and toward the rear cover. The rear cover includes a flat rear surface and a disk retaining mechanism integral with the flat rear surface for retaining the disk. The disk retaining mechanism includes a plurality of first surfaces extending upward from the flat rear surface, each of the plurality of first surfaces extending inwards towards a center position of the disk retaining mechanism, the center position being aligned with a center of the disk when retained by the disk retaining mechanism. The disk retaining mechanism further includes plural riser tabs, and each riser tab is attached to and extends upwards from a respective one of the plurality of first surfaces. The disk retaining mechanism also includes plural retaining tabs, and each retaining tab is attached to a top of a respective riser tab. Each retaining tab extends outwardly away from the center position, and the retaining tabs are sized and positioned relative to the rear cover so as to retain the disk by being disposed immediately above the inner periphery of the disk. Finally, the disk retaining mechanism includes a riser tabs limiting device that is coupled to the plurality of riser tabs for limiting an amount of movement of those riser tabs.

As an aspect of the present invention, the retaining tabs limiting device is a center release button that is attached to each of the riser tabs. The center release button is adapted to move the retaining tabs toward the center position of the disk retaining mechanism when the center release button is depressed so that a retained disk is released upon the depression of the center release button.

As another aspect of the present invention, the center release button is attached to the bottom of each of the riser tabs and the center release button is sized to limit inward movement of each of the riser tabs upon depression of the center release button.

As a further aspect of the present invention, the disk retaining mechanism includes four first surfaces, four riser tabs and four retaining tabs, each of the first surfaces, riser tabs and retaining tabs are disposed concentrically around the center position so that the four riser tabs form a square shaped opening with a center aligned with the center position.

As an additional aspect, each of the four first surfaces includes a respective protruding surface and a horizontal surface attached and integral to the protruding surface so that an inner circular portion of the retained disk immediately adjacent to its center hole rests on each of the horizontal surfaces of the four first surfaces.

As a feature of the present invention, the disk retaining mechanism further includes four second surfaces disposed concentrically around the center position between a respective pair of adjacent first surfaces and extending upward from the flat rear surface of the rear cover towards the center position of the disk retaining mechanism. Each of the four second surfaces is integral with a respective horizontal surface disposed between a respective pair of horizontal surfaces of the four first surfaces so that substantially the entire inner circular portion of the retained disk rests on the horizontal surfaces of the four first surfaces and the horizontal surfaces integral with the four second surfaces.

As another feature of the present invention, the box includes a second disk retaining mechanism for retaining a second disk.

As a further feature of the present invention, all of the components are integral with one another.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE INVENTION

Figure 1:
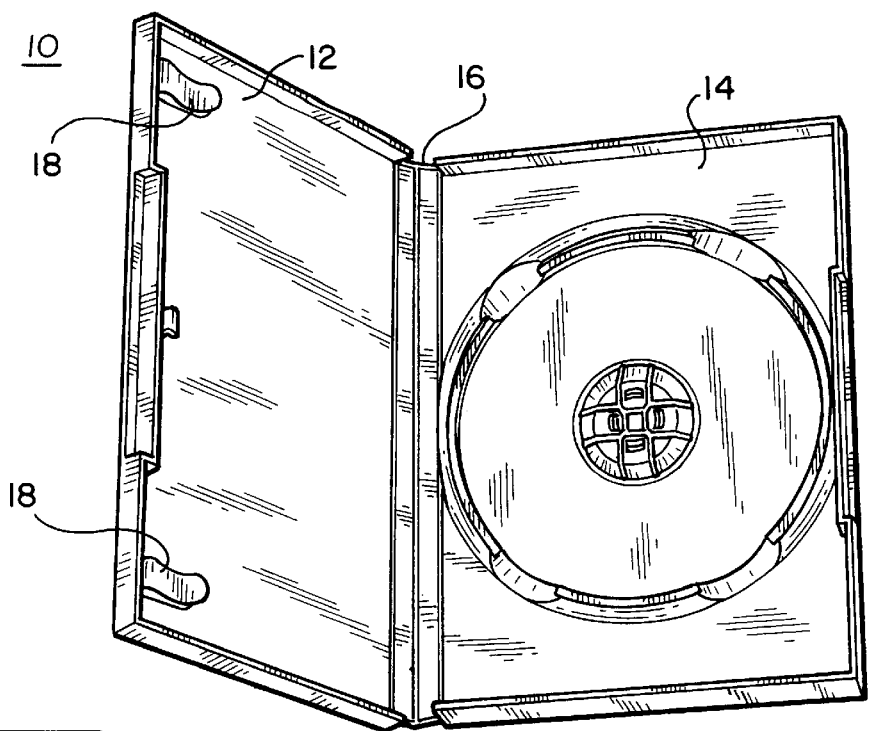
FIG. 1 is a perspective view of the disk storage box of the present invention.

The box for storing audio-visual or computer media disk, simply called disk storage box 10 or box 10 herein, is illustrated in FIG. 1 of the drawings. Disk storage box 10 is designed to storage a compact disk, such as audio CDs, video disks known as DVDs, or computer disks, such as CD-ROM, CD-R and CD-RW disks. Of course, other types of disks may be stored and disks of various sizes may be stored, including so-called mini disks, as well as other types of disks not currently in common usage.

Box 10 includes a front cover (or lid) 12, a rear cover (or base) 14, and a spine 16. Spine 16 is attached to both front and rear covers 12 and 14 and operates as a hinge so that the box may be closed in a manner well known in the art. Spine 16 operates in a manner well known in the art and thus further description thereof is omitted herein. Front cover 12 includes a pair of clips 18 that serve to hold a booklet or other thin item within the box, and such is well known in the art.

Figure 2:
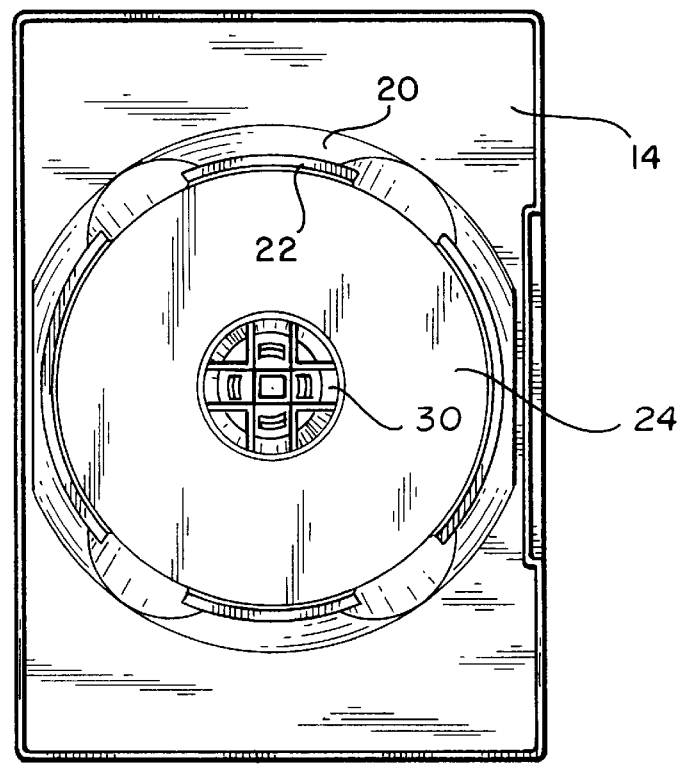
FIG. 2 is a top view of the disk storage box of the present invention.

Referring to FIG. 2, which is a top view schematic illustration of rear cover 14, the rear cover includes a retaining ring 20 that is integral with and extends upwards from rear cover 14. Retaining ring 20 includes a circular, ring-shaped ridge 22 that extends alongside its inner circumference and ridge 22 is sized accordingly so that the outer, circumferential edge of a compact disk rests fully on ridge 22 upon insertion of the disk in storage box 10. The surface of ridge 22 on which a disk rests is slightly above the surface 24 of rear cover 14 so that a small space exists between that portion of the lower surface of the disk containing information and the rear cover's surface 24.

Figure 4:
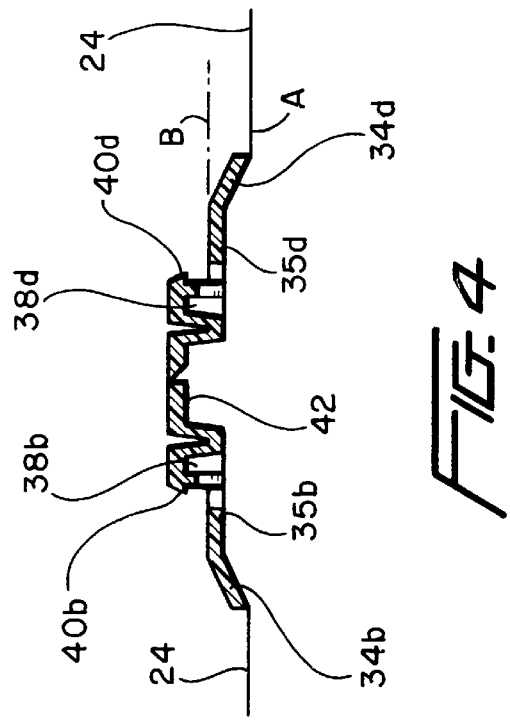
FIG. 4 is a cross-sectional, side view of the disk retaining mechanism of the present invention.

In accordance with the present invention, rear surface 24 includes a disk retaining mechanism 30. Disk retaining mechanism 30 is described with reference to FIGS. 3–4 of the drawings. As shown in the enlarged top view of FIG. 3, disk retaining mechanism includes a number of components and, in the preferred embodiment, disk retaining mechanism including all of its components are formed integral with one another. Firstly, four (4) sets of surfaces 32a, 32b, 32c and 32d, that are disposed respectively 45, 135, 225 and 315 degrees from a position P, extend inwardly towards a center point C and also extend upwardly (as it extends inwardly) from the rear cover's surface 24. Each surface 32 (i.e., 32a, 32b, 32c and 32d) ends with a respective, horizontal corner surface 33 (i.e., 33a, 33b, 33c and 33d) so that surfaces 33a, 33b, 33c and 33d extend along a plane B (see FIG. 4). As shown in FIG. 4, which is a cross-sectional, side view of disk retaining mechanism 30, rear surface 24 extends along a plane A with plane B extending above and parallel to plane A.

Referring back to FIG. 3, mechanism 30 includes four (4) rectangular-shaped protrusions 34a, 34b, 34c and 34d that extend both inwardly and upwardly, similar to how surfaces 32a, 32b, 32c and 34d extend. As shown, protrusions 34a, 34b, 34c and 34d are positioned around center point C at 0, 90, 180 and 270 degrees, respectively, with respect to position P. Moreover, the respective end of each protrusion 34a, 34b, 34c and 34d is integral with a respective horizontal surface 35a, 35b, 35c and 35d (similar in design to surface sets 32a–32d and 33a–33b). Surfaces 35a–35d are horizontally disposed and extend along plane B.

Vertical riser tabs 38a, 38b, 38c and 38d are integral with and extend from a respective horizontal surface 35a, 35b, 35c and 35d. Each riser tab 38 includes, near its top, a respective retaining/lifting tab 40 (i.e., 40a, 40b, 40c and 40d shown in FIG. 3). Each retaining/lifting tab 40 is integral with and extends outwards (horizontally) from a respective riser table. Tabs 40b and 40d are also shown in FIG. 4. As further discussed below, the retaining/lifting tabs 40a, 40b, 40c and 40d serve to retain a disk after the disk's insertion into the storage box of the present invention, and also serve to assist with the lifting of the disk during its removal. Riser tabs 38 and the retaining/lifting tabs 40 are appropriately positioned and sized so that tabs 40 are disposed immediately above an inserted disk and the edges of tabs 40 contact the inner periphery of the seated disk. Moreover, after insertion of a disk (i.e., when it is seated in the disk storage box), the inner portion of the disk (immediately adjacent to its center hole) rests on both sets of horizontal surfaces 33a–33d and 35a–35d.

The lower, inner portions (i.e., closest to center point C) of each of the four riser tabs 38a–38d are connected to (or integral with) a rectangular-shaped, center release button 42. The interconnection between release button 42 and riser tabs 38a–38d is best shown in FIG. 4, which shows the interconnection between riser tabs 38b and 38d with release button 42. Release button 42 may have a hollow interior and open bottom as shown in FIG. 4.

During operation of the disk storage box of the present invention, a disk to be inserted is placed immediately over surface 24 of rear cover 14 so that the disk is in alignment with the circular shape of retaining ring 20 (see FIG. 2). The disk is placed down so that its inner, circular edge is resting directly on the four retaining/lifting tabs 40a, 40b, 40c and 40d. In this position, the disk is urged slightly downward. Preferably, roughly equal force is applied to opposite portions of the top surface of the disk. While the disk is being urged downward, retaining/lifting tabs 40a–40d along with vertical riser tabs 38a, 38b, 38c and 38d likewise are urged downwards. As vertical riser tabs 38a, 38b, 38c and 38d are displaced downwards, horizontal surfaces 35a–35d (integral with the riser tabs) in turn are urged downwards. In like fashion, the upwardly extending end of each of the protrusions 34a, 34b, 34c and 34d that is integral with the horizontal surfaces, is urged downward, which causes each of the protrusions 34a–34d to pivot (slightly) about its respective other end, which is integral with the rear cover's surface 24.

Figure 3:
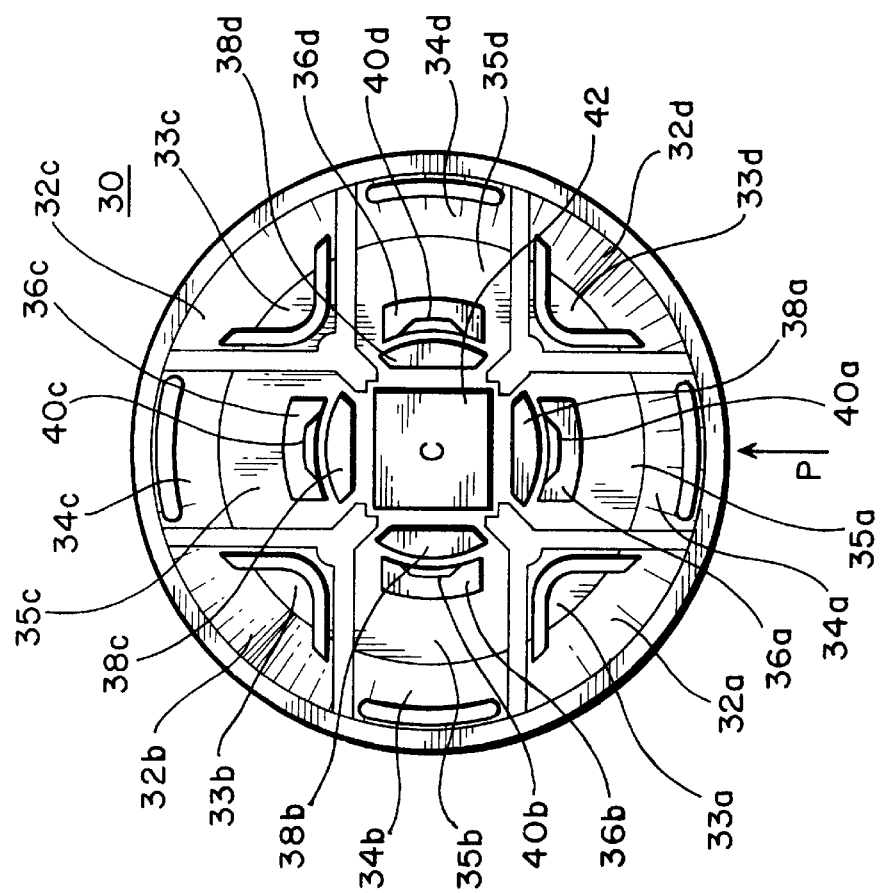
FIG. 3 is an enlarged top view of the disk retaining mechanism of the present invention.
Figure 5:
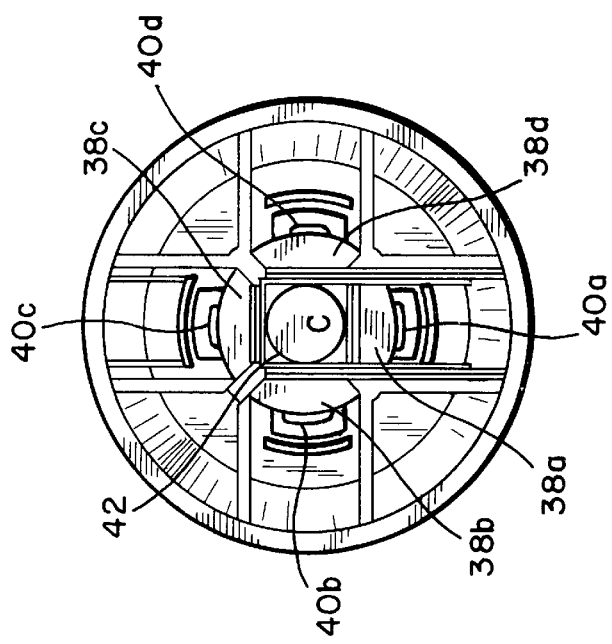
FIG. 5 is a cross-sectional, side view of the disk retaining mechanism of the present invention in a depressed position.

As each protrusion 34a–34d, along with integral horizontal surfaces 35a–35d and vertical riser tabs 38a–38d pivot downward, the relative horizontal positions of riser tabs 38a–38d move closer to center point C to reach the positions shown in FIG. 5. As shown in FIG. 5, and in comparison to the initial positions of the various components as shown in FIG. 3, each of the riser tabs 38a–38d is closer to center release button 42. In like fashion, each of the retaining/lifting tabs 40a–40d are moved closer to center release button 42 (and center point C). The relative lengths of the components are designed so that when retaining/lifting tabs 40a–40d are urged-downward (by depressing a disk thereon), the retaining/lifting tabs 40a–40d move inward (as a result of the above-discussed movement) sufficiently so that the retaining/lifting tabs 40a–40d are able to pass through the disk's center hole as the disk is urged downwards. The retaining/lifting tabs 40a–40d have a sloped upper edge, as best shown in FIG. 4, to further facilitate their downward and inward movement towards center point C as the disk is urged downwards.

Thereafter, after retaining/lifting tabs 40a–40d pass fully through the disk's center hole, the downward force upon those retaining/lifting tabs no longer exists. Likewise, a downward force no longer is applied to the retaining/lifting tabs 40a–40d integral components including riser tabs 38a–38d, horizontal surfaces 35a–35d and protrusions 34a–34d. As a result, all of the components pivot upward back to their initial, resting position so that each of the retaining/lifting tabs 40a–40d move away from center point C and over a respective portion of the disk (immediately adjacent to its center hole) thereby locking the disk in place. Moreover, since each of the riser tabs 38a–38d are attached at their respective lower, inner ends to center release button 42, as discussed above and partially shown in FIG. 4, such interconnection amongst the riser tabs and button 42 provides additional upward bias on risers tabs 38a–38d to further facilitate locking of the disk by retaining/lifting tabs 40a–40d.

In the above-discussed locked position, the outer circumference of the disk rests upon ridge 22 of retaining ring 20 (FIG. 2) and the inner circumference of the disk, immediately adjacent to its center hole, rests upon the horizontal surface 35a, 35b, 35c and 35d, as well as horizontal corner surfaces 33a, 33b, 33c and 33d (immediately on plane B shown in FIG. 4). Since ridge 22 on which the disk rests is slightly above surface 24 of rear cover 14, a small gap exists between the data storage portion of the disk and the rear cover's surface 24.

To release the disk from its locked position, center release button 42 is depressed which in turn forces the attached riser tabs 38a–38d downward. Riser tabs 38a–38d move closer to center point C to the positions shown in FIG. 5, in a manner similar to that described above during insertion of the disk. As riser tabs 38a–38d move inward towards center point C and downward, retaining/lifting tabs 40a–40d likewise move inward and downwards and, during such movement, retaining/lifting tabs 40a–40d pass downward through the disk's center hole thereby releasing the disk. In addition to releasing the disk, whereupon riser tabs 38a–38d and retaining/lifting tabs 40a–40d are in the positions shown in FIG. 5, center release button 42 prevents riser tabs 38a–38d from being pushed down too far to the point where the various components are undesirably weakened or broken. In addition to facilitating in the assistance of locking the disk, as discussed above, and to facilitating the easy release of the disk, as discussed above, the center release button 42 provide stability amongst all of the movement components of the present invention and prevents movement of the various parts beyond predetermined positions. Further, and in accordance with the present invention, the rear cover along with all of the components of the disk retaining mechanism are fully integral with one another. Thus, if the box of any of its components are damaged, those broken components or the box as a whole is prevented from falling apart. This, in turn, greatly enhances the safety standard of the design as compared to prior art designs.

Figure 6:
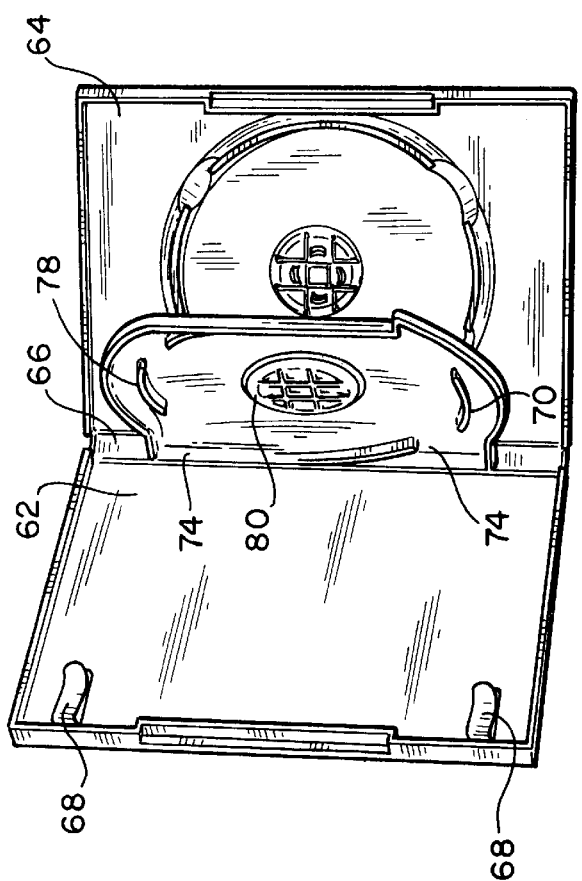
FIG. 6 shows another disk storage box in accordance with the present invention.
Figure 7:
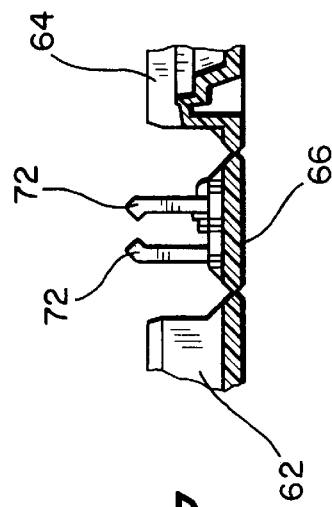
FIG. 7 is an enlarged side view of the spine of the embodiment shown in FIG. 6.

FIG. 6 shows another disk storage box 60 embodying the present invention. As shown, disk storage box 60 includes all of the components shown in the previously discussed embodiment. These include in a front cover (or lid) 62, a rear cover (or base) 64, a spine 66, and a pair of clips 68, all that operate in the manner previously described. Box 60 further includes a second disk holder extension 70 ("second disk holder") that is attached to spine 66. As shown in FIG. 7, which is an enlarged side view of spine 66 showing portions of front cover 62 and rear cover 64, spine 66 include two pairs of holders 72 (only one pair shown in FIG. 7). Each pair of holders 72 receives and holds the second disk holder 70 by grip apertures 74 with second disk holder 70 (apertures 74 shown in FIG. 6). Also, second disk holder 70 includes a retaining ring 78 and a disk retaining mechanism 80 that operate in the same manner that the retainer ring and disk retaining mechanism of the previously discussed embodiment operate. Thus further description thereof is omitted herein.

It is appreciated that the present invention as described herein may be modified while falling within the spirit and scope of the present invention. For example, various surfaces may be modified without affecting the operation of the described disk retaining mechanism. For example, surfaces 32a, 32b, 32c and 32d shown in FIG. 3 are described as extending upwardly as well as inwardly toward center point C. These surfaces, along with attached surfaces 33a–33d, however do not necessarily need to extend upwardly but may extend from rear surface 24 (FIG. 2) along the same plane (i.e., plane A—see FIG. 4). Still further, surfaces 34a–34d and attached surfaces 35a–35d (see FIG. 3) may represent single flat surfaces that together extend upward from rear surface 24.

Therefore, it is intended that the appended claims be interpreted as including the embodiments described herein, the alternatives mentioned above, and all equivalents thereto.

What is claimed is:

1. A box for retaining a disk having a center hole, comprising:
  a front cover;
  a rear cover adapted to retain a disk having a center hole, the front and rear covers rotatably attached so that the box can be open and closed by movement of the front cover away and toward the rear cover;
  the rear cover including a flat rear surface and a disk retaining mechanism integral with the flat rear surface for retaining the disk,
  the disk retaining mechanism including:
    four first surfaces extending upward from the flat rear surface, each of the first surfaces extending inward towards a center position of the disk retaining mechanism, the center position being aligned with a center of the disk when retained by the disk retaining mechanism;
    four riser tabs, each of the riser tabs attached to and extending upwards from a respective one of the first surfaces;
    four retaining tabs, each of the retaining tabs attached to a top of a respective one of the riser tabs, each of the retaining tabs extending outward away from the center position, the retaining tabs being sized and positioned relative to the rear cover so as to retain the disk by being disposed immediately above an inner periphery of the disk, each of the first surfaces, riser tabs and retaining tabs being disposed concentrically around the center position so that the four riser tabs form a square shaped opening with a center aligned with the center position; and
    a square-shaped center release button with four sides, each of the sides attached to a respective one of the four riser tabs for limiting an amount of movement of each of the riser tabs, the center release button adapted to move each of the four retaining tabs towards the center position when the center release button is depressed so that a retained disk is released upon the depression of the center release button.

2. The box according to claim 1, wherein each of the four first surfaces includes a respective protruding surface and a horizontal surface attached and integral to the protruding surface so that an inner circular portion of the retained disk immediately adjacent to its center hole rests on each of the horizontal surfaces of the four first surfaces.

3. The box according to claim 2, wherein the disk retaining mechanism further includes four second surfaces disposed concentrically around the center position between a respective pair of adjacent first surfaces and extending upward from the flat rear surface of the rear cover towards the center position of the disk retaining mechanism, each of the four second surfaces integral with a respective horizontal surface disposed between a respective pair of horizontal surfaces of the four first surfaces so that substantially the entire inner circular portion of the retained disk rests on the horizontal surfaces of the four first surfaces and the horizontal surfaces integral with the four second surfaces.

4. The box according to claim 1, further comprising a second disk holder including a second disk retaining mechanism for retaining a second disk.

5. The box according to claim 1, wherein the flat rear surface of the rear cover and all of the first surfaces, riser tabs and retaining tabs of the disk retaining mechanism are fully integral with one another.

\* \* \* \* \*